United States Patent [19]

Masserang

[11] Patent Number: 4,540,211
[45] Date of Patent: Sep. 10, 1985

[54] JAW ASSEMBLY

[75] Inventor: Gregory J. Masserang, Clarkston, Mich.

[73] Assignee: Android Corporation, Auburn Hts., Mich.

[21] Appl. No.: 463,229

[22] Filed: Feb. 2, 1983

[51] Int. Cl.³ ............................................. B25B 5/04
[52] U.S. Cl. ..................................................... 294/88
[58] Field of Search ...................... 294/88, 116, 87.24, 294/104, 106, 115, 100, 118, 87 R; 269/32, 34, 257, 264; 414/739, 751, 753

[56] References Cited

U.S. PATENT DOCUMENTS 3,312,496 4/1967 Boutelle et al. ........................ 294/88
3,901,547 8/1975 Skinner ................................... 294/88

Primary Examiner—James B. Marbert
Attorney, Agent, or Firm—Stephenson & Boller

[57] ABSTRACT

A jaw assembly for use with a work arm to move workpieces from one station to another is disclosed. The jaw assembly is operable to grip and release workpieces and comprises jaw elements arranged in a uniform pattern about the axis of the jaw assembly which are displaced radially to grip and release workpieces. The actuator comprises a fluid power operated rod coaxial with the axis of the jaw assembly. The rod is operatively coupled with each jaw element by means of a corresponding crank. A pair of flat yieldably resilient strips are cooperative with the crank and the jaw element so as to maintain the jaw element in a predetermined relationship as it moves radially. In the preferred embodiment, this predetermined relationship is a vertical orientation of the work gripping surface of the jaw element, the same as the axis of the jaw assembly which is also vertical.

20 Claims, 5 Drawing Figures

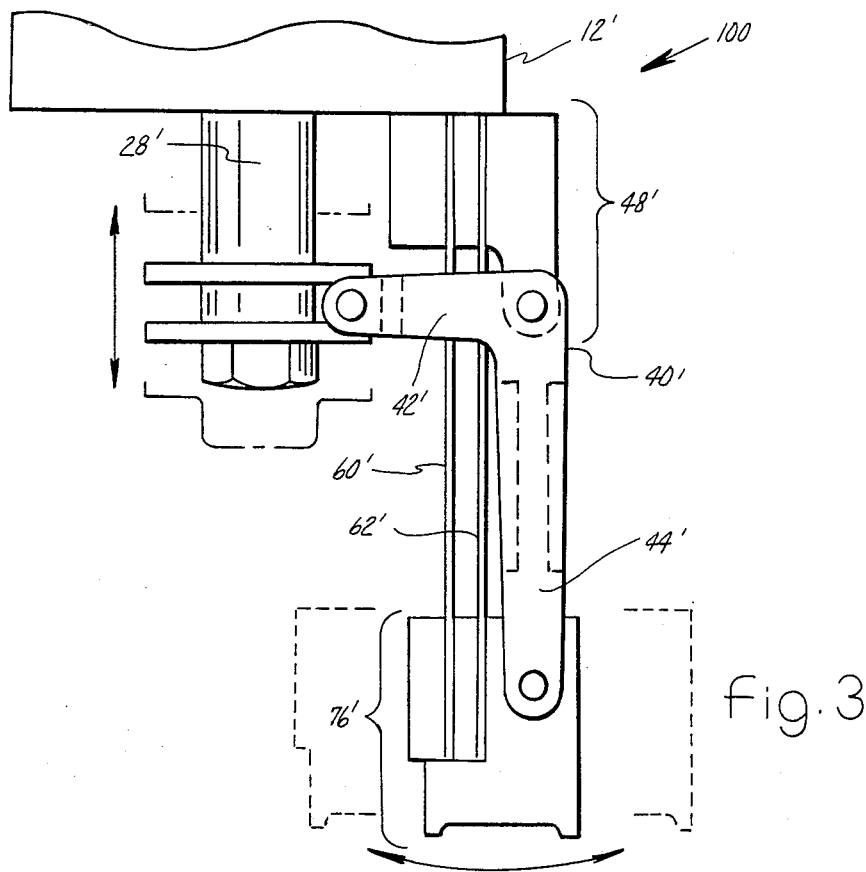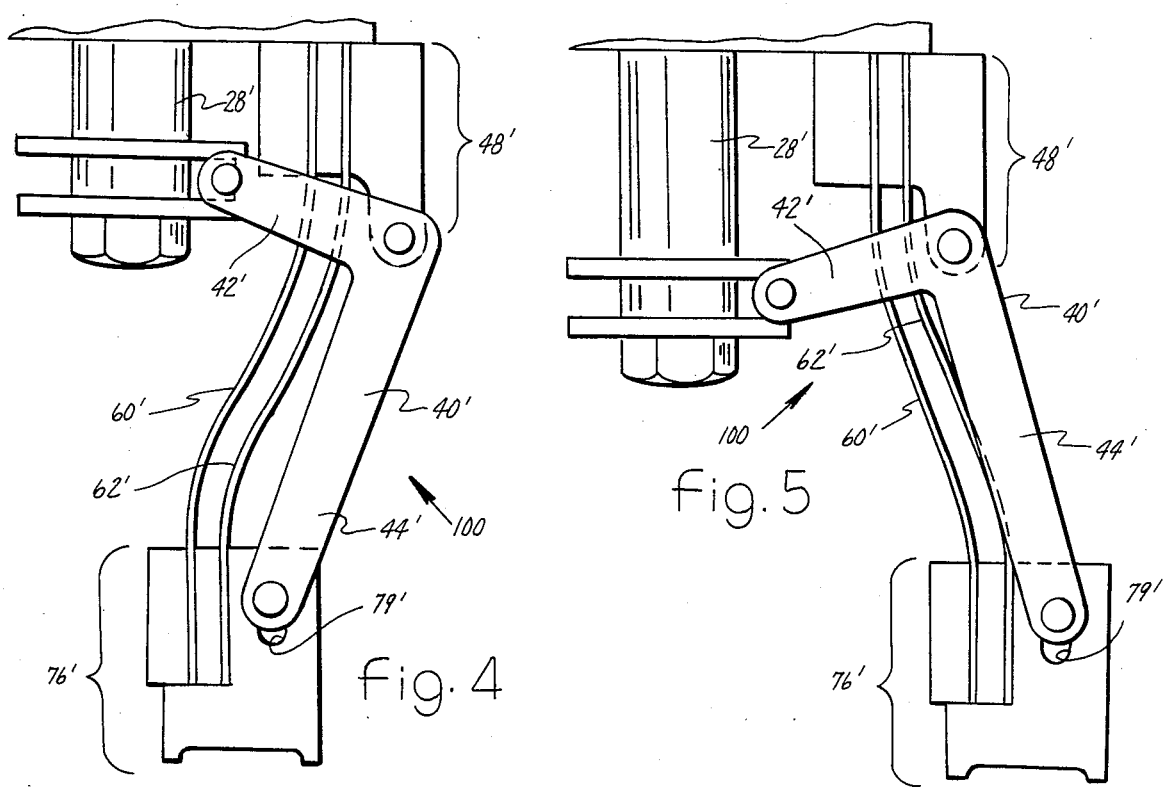

JAW ASSEMBLY

BACKGROUND AND SUMMARY OF THE INVENTION

This invention relates to a jaw assembly for gripping and releasing objects and is of the type which is used in a machine having a movable arm which operates to grip workpieces at one station, by means of said jaw assembly, transfer the workpieces to another station, and release the workpieces at the latter station.

In order to promote productivity in manufacturing operations, it is often desirable to employ machines which can repetitively execute a cycle of operation to move parts, or workpieces, from one station to another station. These devices are today commonly referred to as robots. As such they may comprise a movable arm mounted on the robot device which is operable to grip a workpiece at one station, move the workpiece to another station, and release it at the latter station.

The actual work-engaging means which is used on a work arm may be either passive (no moving parts in of itself), or it may be active (moving parts). Active work-engaging means of this type are commonly referred to as jaw assemblies. When the arm is in the correct position at one station the jaw assembly is operated to grasp a workpiece or workpieces. It maintains its grasp on the workpiece or workpieces while the work arm transfers it or them to another station. Upon arrival at the other station, the jaw assembly releases the workpiece or workpieces and then returns to the first station to conclude a cycle. This cycle is repeated either continuously or in response to a particular stimulus, depending on the operation involved.

It is important that jaw assemblies be capable of reliably gripping workpieces so that they are not inadvertently or accidentally dropped. Disruptions of this type can defeat the purpose of using robots.

It is also important that the jaw assemblies be operable to provide a suitable gripping force upon workpieces in accordance with the particular nature of the workpieces involved. An especially difficult problem is in gripping workpieces from the side (either an inside or an outside diameter, for example) and then lifting and/or lowering such workpieces by means of the work arm. Prior devices have been beset by different problems, for example, having excessive weight, limited stroke, and being not useful with different shaped workpieces.

The present invention is directed to a jaw assembly which is particularly well suited for application where workpieces are gripped from the side and moved with motion which includes a vertical component. It is effective for use in gripping workpieces at either inside or outside diameters, and it is capable of use with a range of varying diameters. Of particular advantage is that the jaw elements of the jaw assembly which grip a workpiece are mounted in such a manner that increased surface gripping area of the jaw elements with a workpiece is obtainable even though the radial motion which is imparted to the jaw elements is along a component which is arcuate rather than truly linearly radial. In other words, the invention is effective, in the case of gripping a vertical surface of a workpiece, to maintain the work gripping surface of the jaw vertical so as to maximize the surface area at which gripping occurs, yet with the use of a linear actuator (i.e. fluid cylinder) which operates axially of the jaw assembly. The invention can be fabricated with relatively simple mechanism, and provide increased surface gripping area for gripping workpieces of various diameters over a range of diameters within the confines of a dimensionally compact envelope. The invention is also susceptible to various embodiments depending upon the particular requirements for gripping and releasing particular workpieces.

The foregoing features, advantages and benefits of the invention along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 3 is a view similar to FIG. 1 illustrating another embodiment of the invention.

FIG. 4 is a view of FIG. 3 illustrating one operative position.

FIG. 5 is a view of FIG. 3 illustrating another operative position.

DESCRIPTION OF THE PREFERRED EMBODIMENT

Figure 1:
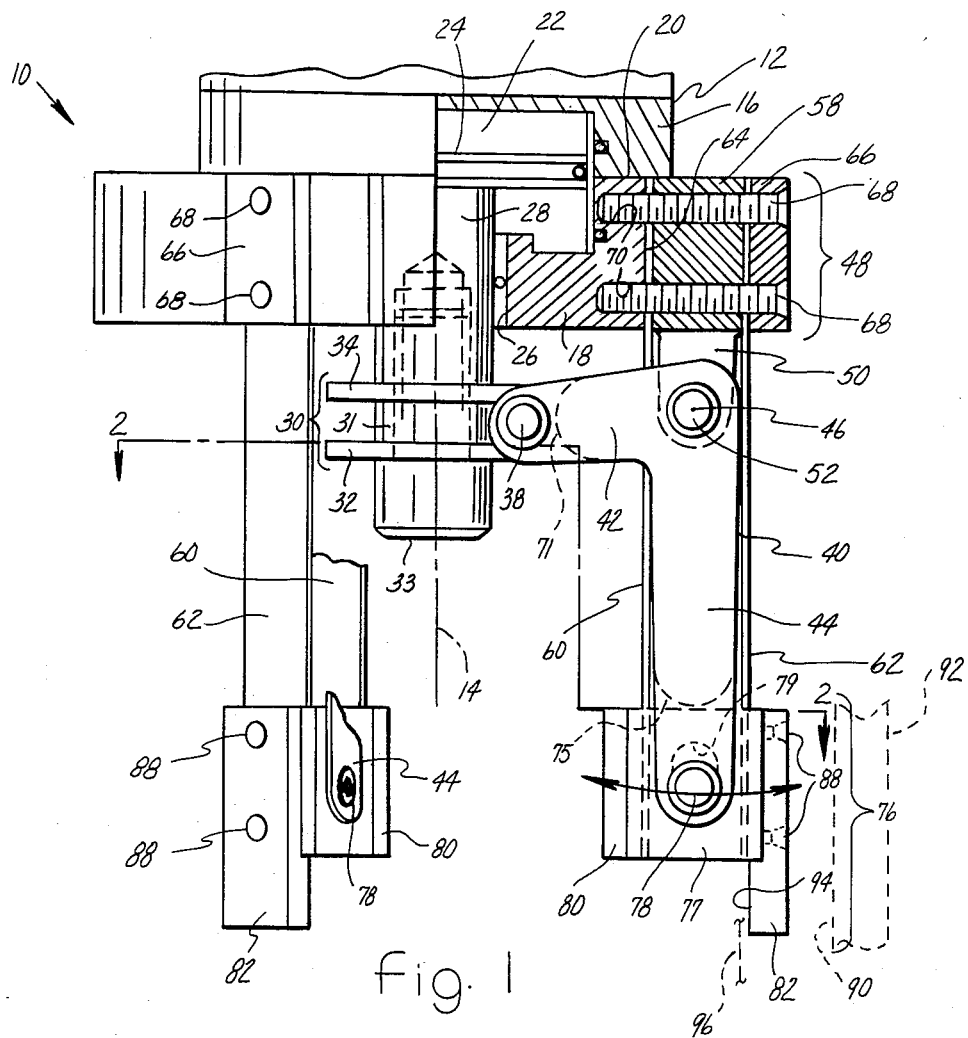
FIG. 1 is a front vertical elevational view having a portion sectioned away illustrating a jaw assembly embodying principles of the present invention.

FIG. 1 illustrates a first embodiment of jaw assembly 10 in accordance with principles of the present invention. It comprises a head designated by the general reference numeral 12 to which various additional components are assembled. The head itself is adapted to be mounted by means (not shown) on a work arm of a robot type device. In the preferred application the jaw assembly is mounted with its axis 14 vertically disposed.

The illustrated head 12 may be considered of multiple element construction including a first head element 16 and a second head element 18 suitably assembled together along mating surfaces indicated by the general reference number 20. The two elements 16 and 18 are constructed to cooperatively define a cylinder space 22 coaxial with axis 14 and within which a piston 24 is disposed. The piston 24 is operable vertically along axis 14. A circular hole 26 is centrally provided through head element 18 coaxial with axis 14. Suitable seals and/or liners may also be used in the construction and these are conventional details involved in the design of fluid cylinders and will not be expounded upon here.

A rod 28 affixed to piston 24 passes through hole 26 to the exterior and is suitably sealed with respect to the hole. Ports (not shown) to cylinder space 22 on opposite sides of piston 24 and suitable external controls (not shown) are also provided such that the rod 28 may be caused to be displaced axially of the jaw assembly on the head in accordance with operation of the controls. FIG. 1 illustrates a position which is at the midpoint of the rod's vertical travel relative to the head.

Figure 2:
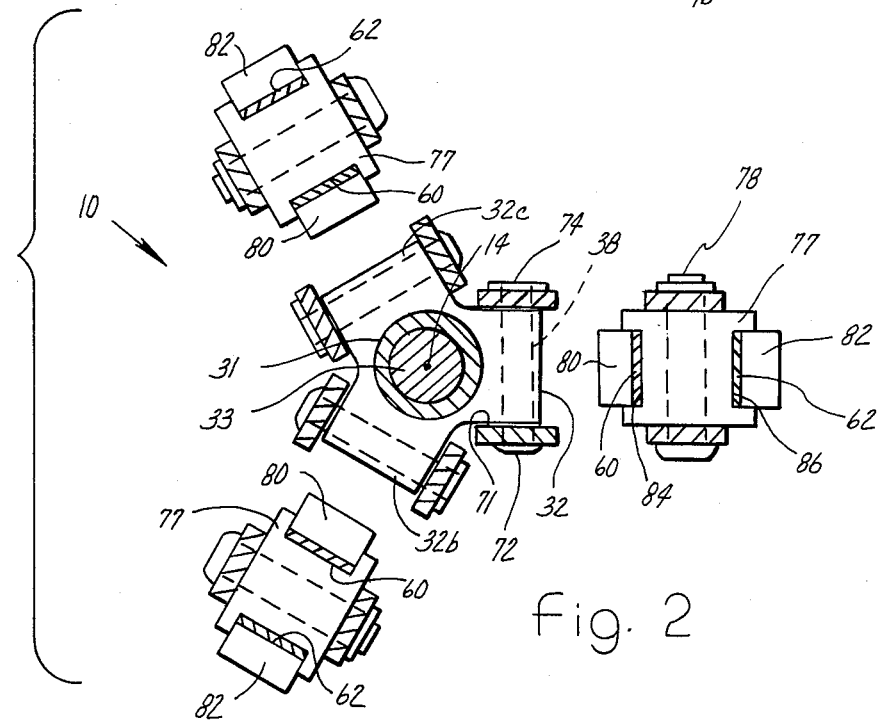
FIG. 2 is a horizontal sectional view taken substantially in the direction of arrows 2—2 in FIG. 1.

Mounted on rod 28 on the exterior of the cylinder space is a coupling 30. The coupling comprises a pair of axially spaced apart elements 32 and 34. The elements 32 and 34 are identical and each comprises a central circular aperture. The two elements 32 and 34 are suitably secured to the rod 28 in a predetermined axially spaced apart relation provided by an annular spacer 31. The shank of a screw 33 passes through the two elements and the spacer and into a tapped hole in the end of rod 28, and the screw head is effective to secure them in place. As can be seen in FIG. 2, element 32 has three radial flanges 32a, 32b, 32c, disposed 120° apart about the axis 14. Element 34 is identical to element 32 and has its three flanges circumferentially aligned with those of element 32. Each pair of axially spaced apart flanges axially captures with a close fit a circular cylindrical pin 38 which is disposed generally tangentially to the OD of spacer 31.

Each pin 38 in turn is operatively coupled with a corresponding crank 40 mounted on the head of the jaw assembly. The illustrated crank on the right in FIGS. 1 and 2 comprises a pair of angularly related crank arms 42 and 44, with the latter being the longer one. Arm 42 is disposed in generally the radial sense while arm 44 is disposed in generally the axial sense.

There is also a pivotal mounting via which the crank is pivotally mounted about a crank axis 46. This crank axis is spaced radially from axis 14 at a given radial distance, and it is tangential to an imaginary circle defined by that radius. The pivotal mounting of the crank is provided by a mounting structure, generally 48, including a clevis 50 which projects vertically downwardly from a clevis block 58. Crank 40 is provided with a suitable recess within which the clevis 50 is received, and a pivot shaft 52 passes through suitable circular holes in both the clevis and the crank to provide for the pivotal mounting about axis 46. Means are provided on shaft 52 on opposite sides of the crank so that shaft 52 is suitably retained.

The mounting structure 48 which includes clevis block 58 also serves to mount resilient elements 60 and 62 which form a part of the jaw assembly mechanism. These resilient elements 60 and 62 are in the form of flat resilient strips which in the position illustrated in FIG. 1 are disposed in vertical planes parallel with each other. For the illustrated mounting structure 48, the upper end of one strip 60 is disposed within a vertical slot 64 formed in the radially outer wall of head member 18. The clevis block 58 fits in the slot and against strip 60. Strip 62 is disposed against the outer surface of block 58, and a keeper 66 fits over strip 62. Thus, the two resilient elements, the clevis block and the keeper are disposed in a stacked relationship, and all are held in place on the head by means of a pair of screws 68 whose shanks pass through suitable clearance holes in the four stacked pieces and thread into suitable tapped holes 70 formed in head member 18 within slot 64. Suitable countersinking of the heads of the screws into the keeper is preferable, as shown.

The vertical dimension between coupling elements 32 and 34 is preferably such as to forcefully clamp onto the diameter of pin 38 when screw 33 is tightened. As can be seen in FIGS. 1 and 2, the distal end of crank arm 42 includes a recess 71 which allows the crank arm to fit closely over the side edges of flange 32a. Pin 38 passes through suitable holes in the sides of the crank arm to provide a pivotal connection of the distal end of the crank arm on the ends of the pin. The pin is retained in place by suitable means 72, 74. With this arrangement, the crank 40 is operatively coupled with rod 28 such that in response to the vertical displacement of the rod along axis 14, there is a corresponding rocking arcuate motion imparted to the crank about axis 46.

The distal end of crank arm 44 includes a recess 75 to receive mounting structure 76 for the mounting of a jaw element 82. The mounting structure 76 includes a mounting block 77 and a keeper 80. Circular holes are provided through crank arm 44 at its distal end and a slot 79 through block 76. A circular pin 78 passes through these holes and slot and is suitably retained in place. The width of the slot is preferably just large enough for pin 78. In the FIG. 1 position, the slot is vertical. The mounting block 77 therefore has a pivotal mounting with respect to the distal end of crank arm 44 about pin 78, but it is also capable of limited axial (i.e. vertical) movement because of slot 79. Block 77 is preferably dimensioned to fit closely between the lower ends of the two resilient strips 60 and 62 so as to maintain them parallel and unstressed in the FIG. 1 position. Additional elements are also provided to keep the assembled relationship. This is done by means of the keeper 80 on one side, the jaw element 82 on the opposite side, and screws 88. As can be seen in FIG. 2, block 77 is provided on opposite sides with vertical grooves 84, 86 within which the lower ends of strips 60 and 62 are respectively disposed. The keeper 80 fits into groove 84 and against strap 60 while jaw element 82 fits into groove 86 and against strap element 62. These are all held in assembled relationship by means of the screws 88. For example, the screws may pass through suitable clearance holes in jaw element 82, strip 62, block 77, strip 60, and into tapped holes in keeper 80, with the screw heads preferably being countersunk.

The jaw assembly of FIG. 1 comprises three jaw elements 82 and corresponding mechanism as described above, and arranged 120° apart about axis 14. Thus the jaw assembly illustrated in FIGS. 1 and 2 is a three jaw element construction in which all jaw elements are simultaneously movable in unison to grip and release workpieces.

From consideration of FIG. 1 it can be understood that in response to operation of rod 28 in the axial direction, crank 40 is pivoted about axis 46. This will result in the distal end of crank arm 44 moving in an arcuate path having a radius about pivot 46. As such, this motion is generally radial of axis 14, but it is not linearly radial; rather it is along the arc which is centered at 46.

The resilient strips 60 and 62 will interact with the mechanism during operation of the crank in the following manner to produce the following detailed motion of jaw element 82. In explaining the operation of the jaw assembly let it be assumed that jaw element 82 is intended to grip the I.D. surface 90 of a workpiece 92. Hence in order to grip the workpiece, the rod 28 will initially be sufficiently retracted to allow the jaw elements to fit within the I.D. of the workpiece. Once they have been axially positioned by means of vertical downward movement of the workarm on which the jaw assembly mounts, then rod 28 is extended to urge the jaw elements radially outwardly. As the jaw elements move radially outwardly of the position illustrated in FIG. 1, but before contacting the workpiece, the strips 60 and 62 will begin to resiliently deflect in a manner analogous to that of a cantilever. Yet, they deform in a general S-shape so that the radially outer surface of jaw element 82 will remain substantially vertical. If there is a slight departure from vertical, it may be generally anticipated that the jaw elements will first make contact with the I.D. surface 90 of workpiece 92 along their lowermost edges as viewed in FIG. 1. When this contact occurs, the mechanism still allows for a final increment of motion of the crank whereby the jaw element is caused to pivot upon the pin 78 so as to allow the outer surface of the jaw element to finally arrive in a position where it is truly vertically disposed against the vertical surface 90. As this final increment occurs, the resilient elements 60, 62 flex slightly more. The S-shape of the strips will be seen in subsequent FIGS. 4 and 5 to be described. With the invention the work gripping surface of the jaw is caused to assume a maximum contact with the workpiece thereby improving the workgripping capability of the jaw assembly. Advantageously this is done with what is strictly a mechanical mechanism and one which is compact and not complicated. Moreover, where the workpiece is not exactly concentric with the three jaws, the mechanism allows resilient conformance to achieve uniform gripping at each of the three 120° spaced apart points. It is therefore an effective and economical means for reliably gripping workpieces.

Moreover, it can be used for gripping either I.D.'s or O.D.'s. For example, it might be possible to use the surface 94 of jaw element 82 to grip onto the O.D. of a workpiece such as indicated by the reference numeral 96. Gripping would occur by retracting the rod 28 so as to displace the jaw elements radially inwardly. Alternate constructions for the jaw elements themselves and their mountings are also anticipated within the scope of this invention.

Another embodiment 100 of the invention is illustrated in FIGS. 3, 4 and 5. The components of this embodiment correspond to those of the first embodiment and are identified by like but primed reference numerals. Embodiment 100, like the first embodiment has three jaw elements and mechanisms 120° apart around axis 14. One of the differences is that the two resilient strips 60' and 62' in embodiment 100 are disposed side-by-side to one side (the radially inner side) of the crank arm 44' whereas in the FIGS. 1 and 2 embodiment, they were spaced apart on opposite sides of the crank arm 44. Also, the shapes of the various mounting blocks, jaw elements and keepers are slightly different.

FIGS. 4 and 5 illustrate the manner in which the resilient strips 60', 62' warp when a workpiece is being gripped. FIG. 3 illustrates the neutral centered position. FIG. 4 illustrates the condition where a very thin workpiece is being gripped on its outside while FIG. 5 illustrates a condition where a much larger diameter workpiece is being gripped on its inside. Thus in addition to being susceptible to various embodiments, the invention in any given embodiment can be used for gripping workpieces having gripping diameters over a range of diameters. Hence, different workpieces may be gripped by the same jaw assembly so that it may not be necessary to have a unique jaw assembly for each workpiece. Moreover, while the illustrated shape of the jaw assemblies has been illustrated as being generally rectangular, it will be appreciated that other shapes may be used and that workpieces may be gripped along surfaces which are not necessarily parallel with the axis of the jaw assembly. In other words a construction is envisioned in which the work gripping surfaces of the jaw elements may be disposed in other than a vertical plane when gripping a workpiece.

While a preferred embodiment of the invention has been disclosed, it will be appreciated that principles of the invention are applicable to other embodiments.

What is claimed is:

1. For use with a work arm which moves workpieces from one station to another, a jaw assembly for releasably gripping the workpieces, said jaw assembly comprising a jaw element which is displaced radially of the axis of the jaw assembly to grip and release workpieces, said jaw assembly including a head via which it is adapted to be mounted on the work arm and an actuator for operating the jaw assembly, said jaw assembly having the improvement which comprises said actuator being displaceable axially of the jaw assembly to operate the jaw assembly, means mounting the jaw element on the head and operatively coupling the jaw element with the actuator comprising a crank, means pivotally mounting the crank on the head, the crank and its pivotal mounting being arranged and constructed such that axial motion of said actuator causes said crank to pivot about its pivotal mounting and at its point of operative coupling with said jaw element to swing in an arc generally radial of the axis of the jaw assembly to impart generally radial motion to the jaw element for gripping a workpiece, and resilient means disposed between the head and jaw element and cooperable with the crank and the jaw element to maintain the jaw element in substantially the same predetermined orientation for gripping workpieces irrespective of the amount of radial displacement imparted to the jaw element by the crank for gripping a workpiece, and including an axial lost motion connection in the coupling between the jaw element and the head to take up a component of relative axial motion between the crank and said resilient means as the crank is operated by the actuator.

2. The improvement set forth in claim 1 in which the jaw assembly includes a plurality of such jaw elements disposed in a uniform pattern around the axis of the jaw assembly, means mounting each such jaw element on the head and operatively coupling each such jaw element with the actuator comprising a corresponding crank, and means pivotally mounting each such crank on the head, each crank and its pivotal mounting being arranged and constructed such that axial motion of said actuator causes the corresponding crank at its point of operative coupling with the corresponding jaw element to swing in an arc generally radially of the axis of the jaw assembly to urge the corresponding jaw element generally radially of the jaw assembly axis to grip a workpiece, and resilient means for each jaw element disposed between the head and the corresponding jaw element and cooperable with the corresponding crank and jaw element to maintain the corresponding jaw element in substantially the same predetermined orientation for gripping a workpiece irrespective of the amount by which the jaw element is radially displaced by the corresponding crank to grip a workpiece, and including an axial lost motion connection in the coupling between each jaw element and the head to take up a component of relative axial motion between each crank and the corresponding resilient means as the cranks are operated by the actuator.

3. The improvement set forth in claim 1 in which said actuator comprises a fluid power operated rod coaxial with the axis of the jaw assembly and which is movable by fluid power axially with respect to the head.

4. The improvement set forth in claim 3 including flange means on said rod, said crank having an arm operatively coupled with said flange means so as to be operatively coupled with said rod, the operative coupling of the crank arm with said flange means comprising said flange means being a pair of axially spaced apart flange surfaces and a pin captured axially by said flange surfaces, said crank arm having a pivotal connection with said pin.

5. The improvement set forth in claim 1 in which said axial lost motion connection comprises the operative connection of the crank to the jaw element comprising a slot and pin connection which allows the jaw element to pivot about an axis passing through the crank and jaw element and to also be bodily displacable along the slot in the direction axially of the jaw assembly.

6. The improvement set forth in claim 1 in which the means by which the crank is pivotally mounted on the head comprises a clevis block having a clevis with the crank being pivotally mounted on the clevis, said resilient means having an end terminus disposed against the clevis block, and fastening means extending through the clevis block and said end terminus of said resilient means for fastening the clevis block and the resilient means on the head.

7. The improvement set forth in claim 5 in which said resilient means comprises a pair of flat yieldably resilient strips disposed generally parallel with each other and extending parallel to the axis of the jaw assembly in an unstressed condition, said strips being operable to deform from their unstressed condition of parallelism with the axis of the jaw assembly when the jaw assembly is operated to a position gripping a workpiece, said strips being disposed on opposite radial sides of the clevis block relative to the axis of the jaw assembly, and said fastening means extending through both said strips and said clevis block to mount same on the head.

8. The improvement set forth in claim 6 in which said resilient means comprises a pair of flat yieldably resilient strips disposed generally parallel with each other and extending parallel to the axis of the jaw assembly in an unstressed condition, said strips being operable to deform from their unstressed condition of parallelism with the axis of the jaw assembly when the jaw assembly is operated to a position gripping a workpiece, one of said resilient strips being disposed against the clevis block and further including a spacer between said one resilient strip and the other resilient strip said fastening means extending through said clevis block, said spacer and said pair of resilient strips to mount same on the head.

9. The improvement set forth in claim 5 in which the jaw element mounts on a mounting block and the slot and pin connection of the jaw element and the crank comprises the slot in the mounting block and the pin on the crank extending through the slot.

10. The improvement set forth in claim 1 in which said crank comprises a pair of angularly related crank arms one of which is disposed generally radial of the axis of the jaw assembly and the other which is disposed generally axial of the axis of the jaw assembly, said one crank arm being operatively coupled with said actuator and said other crank arm being operatively coupled with the jaw element.

11. The improvement set forth in claim 1 in which the jaw element has a work-engaging surface disposed parallel to the axis of the jaw assembly and constituting said predetermined orientation.

12. The improvement set forth in claim 1 in which said resilient means comprises a pair of flat yieldably resilient strips disposed generally parallel with each other.

13. For use with a work arm which moves workpieces from one station to another, a jaw assembly for releasably gripping the workpieces, said jaw assembly comprising a jaw element which is displaced radially of the axis of the jaw assembly to grip and release workpieces, said jaw assembly including a head via which it is adapted to be mounted on the work arm and an actuator for operating the jaw assembly, said jaw assembly having the improvement which comprises said actuator being displacable axially of the jaw assembly to operate the jaw assembly, means mounting the jaw element on the head and operatively coupling the jaw element with the actuator comprising a crank, means pivotally mounting the crank on the head, the crank and its pivotal mounting being arranged and constructed such that axial motion of said actuator causes said crank to pivot about its pivotal mounting and at its point of operative coupling with said jaw element to swing in an arc generally radial of the axis of the jaw assembly to impart generally radial motion to the jaw element for gripping a workpiece, and resilient means cooperable with the crank and the jaw element to maintain the jaw element in substantially the same predetermined orientation for gripping workpieces irrespective of the amount of radial displacement imparted to the jaw element by the crank for gripping a workpiece, and in which said resilient means comprises a pair of flat yieldably resilient strips disposed generally parallel with each other and extending parallel to the axis of the jaw assembly in an unstressed condition, said strips being operable to deform from their unstressed condition of parallelism with the axis of the jaw assembly when the jaw assembly is operated to a position gripping a workpiece.

14. The improvement set forth in claim 13 in which the crank comprises an arm disposed generally axially of the jaw assembly and said pair of resilient strips are disposed both on the same radial side of said crank arm relative to the jaw assembly axis.

15. The improvement set forth in claim 13 in which the crank comprises a crank arm disposed generally axially of the jaw assembly and said pair of resilient strips are disposed on opposite radial sides of said crank arm relative to the jaw asembly axis.

16. The improvement set forth in claim 13 in which the pivotal mounting of the crank on the head also serves to mount said pair of resilient strips at one end thereof on the head and including additional mounting structure for mounting the resilient strips at the opposite end thereof with the jaw element, the additional mounting structure including a connection with said other crank arm.

17. The improvement set forth in claim 13 in which the jaw assembly includes a plurality of such jaw elements disposed in a uniform pattern around the axis of the jaw assembly, means mounting each such jaw element on the head and operatively coupling each such jaw element with the actuator comprising a corresponding crank, and means pivotally mounting each such crank on the head, each crank and its pivotal mounting being arranged and constructed such that axial motion of said actuator causes the corresponding crank at its point of operative coupling with the corresponding jaw element to swing in an arc generally radially of the axis of the jaw assembly to urge the corresponding jaw element generally radially of the jaw assembly axis to grip a workpiece, and a corresponding resilient means for each such jaw element disposed between the head and the corresponding jaw element and cooperable with the corresponding crank and jaw element to maintain the corresponding jaw element in substantially the same predetermined orientation for gripping a workpiece irrespective of the amount by which the corresponding jaw element is radially displaced by the corresponding crank to grip a workpiece, each such resilient means comprising a pair of such flat yieldably resilient strips disposed generally parallel with each other and extending parallel to the axis of the jaw assembly in an unstressed condition, each such pair of strips being operable to deform from their unstressed condition of parallelism with the axis of the jaw assembly when the jaw assembly is operated to a position gripping a workpiece.

18. In a jaw assembly comprising a jaw element which is operated by actuator means to be displaced radially of the axis of the jaw assembly to grip and release workpieces, the improvement for maintaining the jaw element in substantially the same predetermined orientation for gripping workpieces as it is radially displaced comprising a pair of yieldably resilient elements spaced radially apart and extending generally axially of the jaw assembly and cooperable with the jaw element and the actuator means to maintain the jaw element in said predetermined orientation as the jaw element is radially displaced by said actuator means, and in which said pair of yieldably resilient elements comprise flat strips disposed in planes parallel with each other and with the axis of the jaw assembly when in an unstressed condition.

19. The improvement set forth in claim 18 in which the actuator means includes a crank having a crank arm which moves in a radial direction about an arc centered at the pivot of the crank to impart the radial motion to the jaw element.

20. The improvement set forth in claim 18 in which the jaw element has a work-engaging surface disposed parallel to the axis of the jaw assembly and constituting said predetermined orientation.

* * * * *

UNITED STATES PATENT AND TRADEMARK OFFICE
CERTIFICATE OF CORRECTION

PATENT NO. : 4,540,211
DATED : September 10, 1985
INVENTOR(S) : Gregory J. Masserang It is certified that error appears in the above-identified patent and that said Letters Patent is hereby corrected as shown below:

In claim 7, line 1 thereof (column 7, line 20) "5" should read --6--.

Signed and Sealed this

Third Day of December 1985

[SEAL]

Attest:

DONALD J. QUIGG

Attesting Officer

Commissioner of Patents and Trademarks